United States Patent [19]

Regipa

[11] Patent Number: 4,911,380

[45] Date of Patent: Mar. 27, 1990

[54] PROCESS AND APPARATUS FOR HOOKING A BAND OF A FLEXIBLE MATERIAL TO A FIXATION PIECE, AND APPLICATION TO THE HOOKING OF AN ENVELOPE, ESPECIALLY A SPACE BALLOON, TO A FIXATION PIECE

[75] Inventor: Robert Regipa, Toulouse, France

[73] Assignee: Centre National d'Etudes Spatiales, Toulouse, France

[21] Appl. No.: 107,704

[22] Filed: Oct. 9, 1987

[30] Foreign Application Priority Data

Oct. 13, 1986 [FR] France .................. 86 14291

[51] Int. Cl.[4] .............................. B64B 1/40
[52] U.S. Cl. ................................ 244/31; 244/127; 24/459
[58] Field of Search ............... 244/31, 127; 24/30.5 P, 24/230.5 SP, 129 D, 129 W, 130, 477, 478, 459, 460, 461, 483, 484, 529, 530, 532

[56] References Cited

U.S. PATENT DOCUMENTS

| | | | | |
|---|---|---|---|---|
| 1,079,431 | 11/1913 | Nitka | ...................... | 24/460 |
| 1,828,821 | 10/1931 | Short et al. | ...................... | 244/31 |
| 2,919,082 | 12/1959 | Winzen et al. | ...................... | 244/31 |
| 2,919,083 | 12/1959 | Suomi et al. | ...................... | 244/31 |
| 3,686,721 | 8/1972 | Nelson | ...................... | 244/31 |

Primary Examiner—Galen Barefoot
Assistant Examiner—Rodney Corl
Attorney, Agent, or Firm—Harold H. Dutton, Jr.

[57] ABSTRACT

A process and an apparatus for hooking of a band of a flexible material, intended to be subjected to tensile forces, to a fixation piece, for hooking onto the fixation piece of an envelope of which the end portion is divided along a given length, into a plurality of bands of equal width, the process comprising longitudinally folding one extremity of the band upon itself, at least one time, in such a manner as to form at least one hem (14, 15), transversely gathering the hem in accordian fashion in such a manner as to form a flange presenting a fan-shaped configuration, using a fixation piece provided with a groove of a wedge-shape conjugate to the shape of the flange, the groove having a longitudinal extremity opening toward its apex, and arranging the flange within the groove, the band extending through the open extremity of the groove in such a manner as to create a self-locking of the flange when the band is placed in tension.

19 Claims, 5 Drawing Sheets

PROCESS AND APPARATUS FOR HOOKING A BAND OF A FLEXIBLE MATERIAL TO A FIXATION PIECE, AND APPLICATION TO THE HOOKING OF AN ENVELOPE, ESPECIALLY A SPACE BALLOON, TO A FIXATION PIECE

This invention relates to a process for hooking to a fixation piece, a band made from a flexible material and especially intended to be subjected to longitudinal tensile forces. The invention also applies to a process for securing an envelope comprising a sheath of flexible material onto a fixation piece, and an apparatus for hooking an envelope onto a fixation piece carrying out the process.

The invention applies, in particular, to the hooking of the envelope of a space balloon onto fixation pieces situated on the axis of this envelope and defining the upper and lower poles thereof.

BACKGROUND AND OBJECTS OF THE INVENTION

Works carried out in the field of space balloons have led to the development of balloons of a generally cylindrical form for supporting very high over-pressures. In effect, support of the over pressure on the ends of the cylinder is assured by the simultaneous effect of three actions: the action of the envelope itself, the action of an inter-polar connection connecting the two poles of the envelope, and the action of an external network of longitudinal reinforcements. The ability of the cylindrical wall to support the over-pressure is assured by the provision of longitudinal lobes separated by a network of circumferential reinforcements, additionally assuring the taking up of the radial component of the longitudinal tension. Proven methods of calculation permit, in each application, the adjustment of the different parameters (density of the circumferential network, density of the longitudinal network . . . ) in such a manner as to optimize the range of constraints applicable to the envelopes. The mastery of these different parameters thus permits obtaining flexible envelopes of very high over pressure in which the forming material (with assymetrical resistance higher in the longitudinal direction than in the circumferential direction) works in the optimum conditions—that is to say in each direction, its elastic limit multiplied by a coefficient of safety.

In fact, at the present time, the primary difficulties remaining relate to the hooking of the extremities of an envelope to the pole pieces, necessitating particular consideration for resolving the problems of the interface between the flexible structure and the rigid structures to be supported, such problems presenting very important constraints. The different hooking devices available necessitate in practice over-dimensioning of the pole pieces because of the significant torque to which the pole pieces are subjected. Moreover, and in particular, these devices require the provision of a locking flange on the extreme edge of the envelope. Further, the geometric definition of the flange being rarely perfect, different strands forming the longitudinal warp of the envelope are subjected to different longitudinal stresses, and this leads to the creation of sheer forces, which are difficult to quantify.

The present invention proposes to furnish a process for hooking or securing an envelope to a fixation piece, which permits taking up or bearing significant forces, while assuring the gas-tight seal of the envelope, and which solves the problems discussed above.

To this effect, an essential object of the invention is to provide a process for hooking an envelope permitting the homogenization of the constraints in the different strands forming the longitudinal warp of the envelope.

Another object of the invention is to reduce the intensity of the torsional stresses to which the fixation pieces are subjected.

Another object of the invention is to provide a process enabling a simplification of, and making very precise, the different operations involved in hooking an envelope to a fixation piece.

Another object of the invention is to permit controlling the hooking characteristics, before the filling of the envelope.

Another object is to provide a process for hooking onto a fixation piece the external longitudinal reinforcements permitting the transmission of torque tending to rotate the envelope.

DESCRIPTION OF THE INVENTION

The process according to the invention permits hooking of a longitudinal extremity of a band of flexible material to a fixation piece, and comprises:

longitudinally folding the extremity of the band upon itself at least one time, in such a manner as to obtain at least one hem, transversely folding, in an accordian fashion, the extremity of the hem in such a manner as to provide a fanshaped flange or rim, using a fixation piece provided with a groove having a longitudinal cross-section in the form of a splayed shape conjugate to the shape of the flange, the groove having a longitudinal extremity open toward its top, arranging the fan-shaped flange of the band in the above mentioned groove of the fixation piece, with the band extending out of the groove at the open extremity thereof, in such a manner as to establish a self-locking of the flange when subjected to the tension of the band.

Preferably, the process comprises folding the extremity of the band at least two times on itself in such a manner as to obtain a double hem, this double hem presenting a width (1) less than the width (L) of the first hem.

The provision of at least one double hem of decreasing width permits, especially during gathering of the band, obtaining naturally the fan-shaped form of the flange.

This process authorizes a total modelizing of all of the operations carried out, which permits optimizing the shapes and finding the best compromise for resolving the interface problem. Moreover, the geometry of the flange being precisely defined, the different strands forming the longitudinal warp of the band are entreated independently of each other and are subjected to the same tensile forces, thereby obtaining suppression of the shearing forces between strands.

In order to obtain a better transmission of forces acting upon the extremities of the folds, the opposing faces of the hems and the opposing faces of the two successive hems are preferably secured to each other. The different folds of the hems may also be advantageously sewed together by means of threads of a material of high tensile strength. Thus, a tractile or tensile force exerted on the band generates a compression of all of the components of the block due to the sewing and to the securing of the different folds and, consequently, a self-locking of the flange at the interior of the groove of the fixation piece.

Furthermore, if the frictional forces between the different folds of the hems prove to be insufficient for permitting self-locking in the groove, a hardenable resin is advantageously injected into the groove in the fixation piece, after placing the fan-shaped flange in the groove. As will be understood hereinafter, this resin-blocking permits obtaining at least a double wedging effect which carries with it an increase of the surfaces of the friction of the flange.

This flange embedded in its block of resin, thereby forms the element for resisting the forces transmitted by the band, by the rigid mechanical assembly in the form of the fixation piece. In order to minimize the dimensions of this fixation piece, the groove at the interior of which is arranged the flange, preferably presents an axis of symmetry situated on the extension of the longitudinal axis of the band. Thus, when this band is placed in tension, the fixation piece is not subjected to any torque.

The process applies to hooking an enelope made of a sheath of flexible material to a fixation piece. It thus comprises:

longitudinally splitting for a given length and at equidistant intervals, an extremity of the sheath, in order to form plurality of bands, or strips, forming (in accordance with the process described above), a flange having an fan-shape, at the level of the extreme end of each band thus obtained, using an annular fixation piece made of a rigid material and having an annular groove with a splayed cross-section in the form of a circular sector conjugate to the shape of the flange, the groove being provided, at its top, with an opening extending outwardly to the peripheral wall of the fixation piece, at the circumference thereof, and arranging the different flanges side by side on the interior of the said groove on the fixation piece.

The different flanges are therefore arranged in the annular groove of the fixation piece, and then embedded in the hardenable resin in such a manner as to form a bead by the mechanical assembly. Further, a multiplication of the number of these grooves permits obtaining a good definition of the system of revolution, and the formation of a homogeneous block of slight angular steps.

Further, in order to facilitate placement of the different flanges in the interior of the annular groove, the fixation piece is preferably disassemblable in two annular pieces having opposing faces in such a form as to cooperatively form the annular groove, when assembled into the assembly position.

The annular groove is, furthermore, advantageously arranged at the center of the fixation piece, and the assembly of the two annular pieces is secured by means of screws arranged to connect the one part of the annular flange to the other. This arrangement of screws permits significant reduction in mass of the fixation pieces. These screws positioned at the outer sides assure, in effect, a rigid assembly of the annular pieces when subjected to tension of the envelope.

This reduction of the mass of the fixation piece is also favored by the disposition of an annular groove which provides, advantageously, a transverse plane of symmetry essentially orthogonal to the access of the sheath. When subjected to the tension of the envelope, the fixation piece is therefore subjected to no torque.

The gas-tightness of the envelope is, preferably assured by a sealing flap secured, on one end, to the internal face of the envelope adjacent the extremity of hhe longitudinal slits in such a manner as to serve also as a band for stopping the slits, and on the other hand secured to the fixation piece. This sealing flap thus serves the double function of a band for stopping the longitudinal slits and for sealing means for the envelope. It is known that the functions of mechanical resistance (transmission of longitudinal forces) and sealing are fulfilled by distinct elements. In this case, the sealing is no longer assured by the envelope itself and the problem posed by the provision of longitudinal slits and the placement of the grooves on the external side of the annular groove are found to be resolved.

This process applies more particularly for the hooking of an envelope of a generally cylindrical form such as described in French patent No. 2,472,971 to the present applicant, i.e. obtained by the longitudinal assembly of N rectangular gores of the same width. The process therefore comprises interrupting the assembly of the gores at a pre-determined distance from their longitudinal extremity in order to form a plurality of bands, and shaping the extreme edge of each band in such a manner as to provide, in accordance with the above described process, a plurality of flanges having a fan-shaped form.

The extremity portion of each gore may, additionally, be divided into several bands of the same width separated by a longitudinal slit, and the edge of which is shaped so as to provide a fan-shaped flange. This multiplication of flanges permits, in effect, obtaining the formation of a homogeneous block of several slight angular steps. But the principal advantage of the process, in this particular application, resides in the possibility of testing individually each gore. The constraints of fabrication and of safety are thereby notably diminished, and the overall mechanical concept of hooking the envelope to a fixation piece is much more sound than for prior processes.

The process permits, furthermore, the hooking to an annular fixation piece of a network of reinforcements extending longitudinally the length of an envelope of a generally cylindrical form. It comprises, therefore, arranging the said reinforcements in such a manner that they form a radiating structure with rays crossed at the end of the envelope. The longitudinal network thereby permits the transmission to this envelope of torsional forces for rotating the same.

The hooking of the network of reinforcements to the fixation piece, may advantageously comprise:

providing an annular rim including an external peripheral face having an annular groove and peripheral edges having studs, fixing the rim concentrically around the fixation piece, hooking the longitudinal reinforcements, alternatively, to the studs of one and then the other peripheral edge of the rim, arranging in the annular groove of the rim a tightening collar made of a material only slightly extensible and of high resistance to tensile forces in order to take up the longitudinal forces transmitted by the reinforcements, for placing in tension the tightening collar.

This embodiment presents three essential advantages which permit taking up very high longitudinal tensile forces:

Taking up the longitudinal forces acting on the reinforcements by the tightening collar placed in tension according to its preferential direction of deformation, The annular form of the ring which carries along an auto-equilibration of forces acting on the tightening collar: the forces transmitted to the fixation piece are therefore very weak, Hooking of the reinforcements, alternatively, to one and the other peripheral edge, which permits subjecting the rim to symmetrical forces, avoiding transmission of torque.

The invention extends to a device for hooking an envelope obtained by means of a sheath of flexible material to an annular fixation piece. According to the present invention, this device is characterized in that the fixation piece is made of a rigid material and formed of two annular pieces having having opposing assembly faces of a form adapted to form cooperatively an annular groove having a splayed cross-section, the fixation piece including an external peripheral face provided with an annular groove opening into the recess, toward the top thereof.

DESCRIPTION OF THE DRAWINGS

Other characteristics, objects and advantages of the invention will become apparent from the detailed description which follows and from consideration of the annexed drawings which present, by way of non-limiting examples, one preferred embodiment. In these drawings which are an integral part of the description.

DESCRIPTION OF PREFERRED EMBODIMENTS

Figure 5:
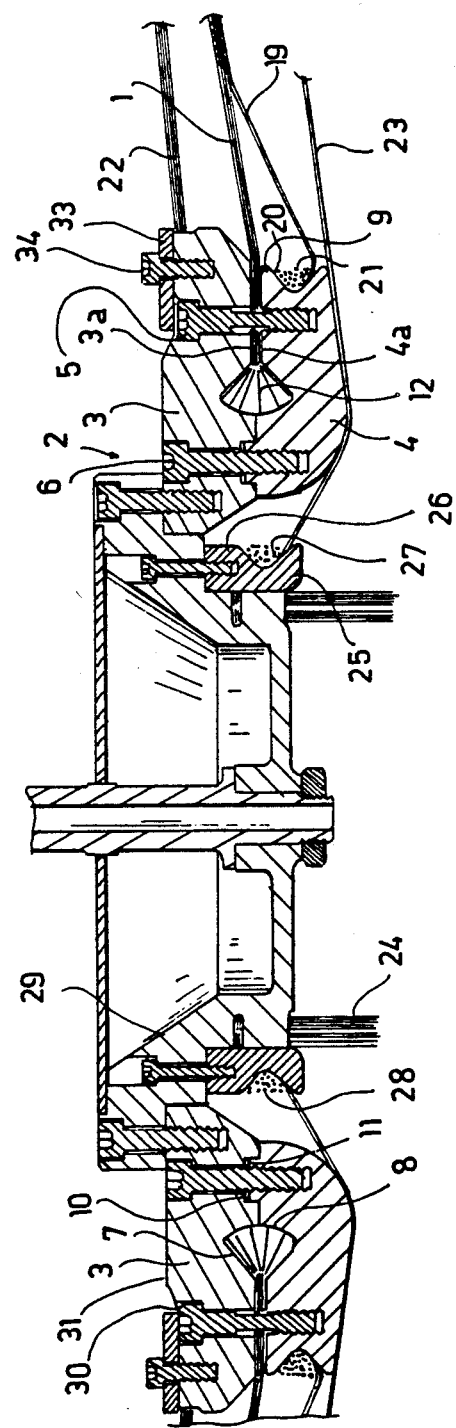
FIG. 5 is a longitudinal sectional view of a device for hooking an envelope to fixation piece situated at the upper pole of the envelope.
Figure 6:
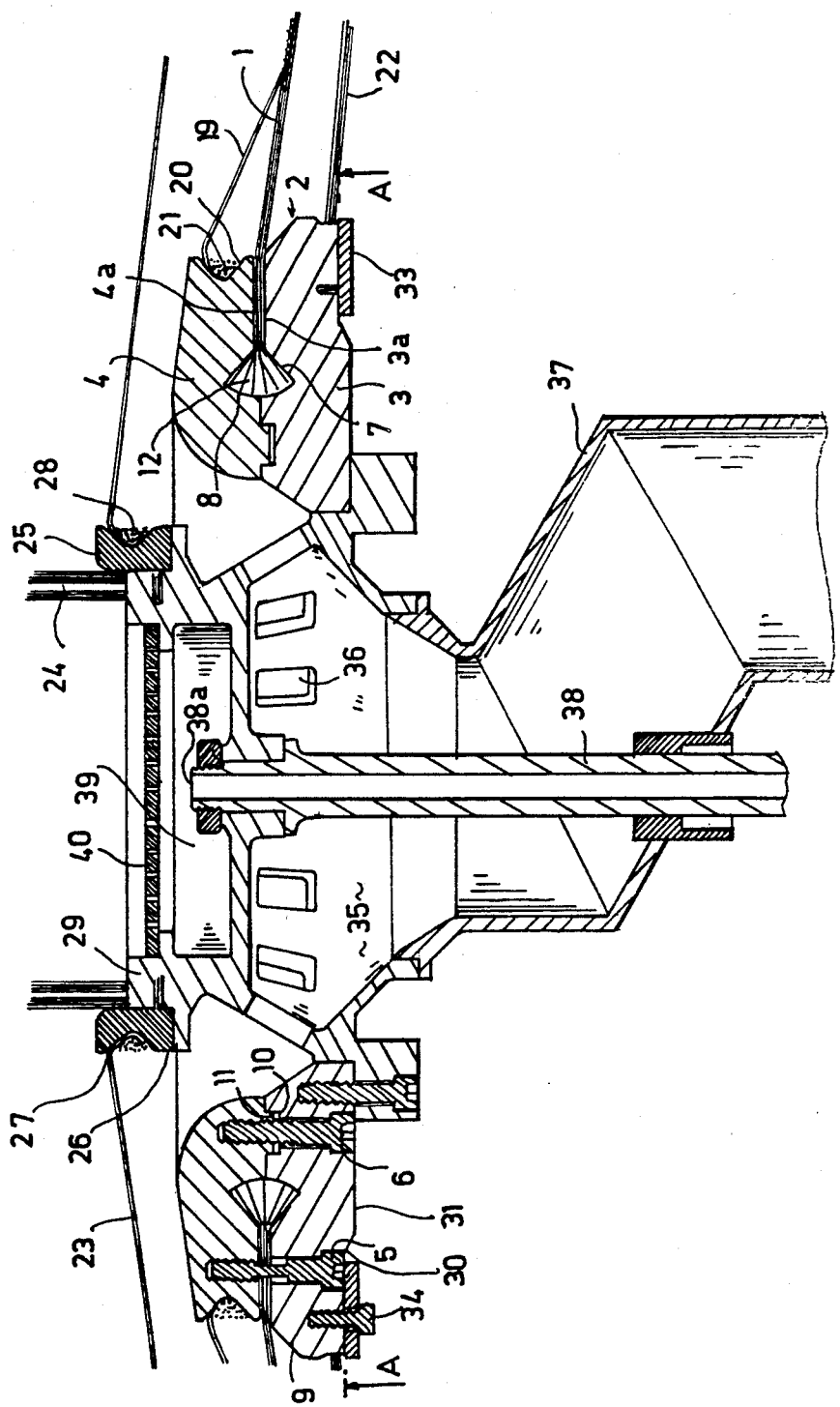
FIG. 6 is a longitudinal sectional view of a device for hooking an envelope to a fixation piece situated at the lower pole of the envelope.

The hooking device shown by way of example in FIGS. 5 and 6 is intended for hooking the extremities of an envelope 1 to the pole pieces disposed at the upper and lower poles of this envelope, on the axis thereof. It applies in particular to hooking, to the pole pieces, the extremities of a space balloon envelope of a generally cylindrical form and formed by the longitudinal assembly of N rectangular gores.

This envelope 1, such as for example described in French patent application No. 84.18798 of the same inventor, is comprised of a composite material comprising a longitudinal warp of "Kevlar" and a circumferential weft of polyester, an exterior polyethylene film, and an interior polyester film.

This device comprises a fixation piece 2 of an annular form made from a rigid material. This fixation piece is formed from two annular pieces 3, 4 adapted to be assembled by means of fixation screws 5, 6. These two annular pieces 3, 4 have opposing assembly faces 3a, 4a, each provided in its central zone with an annular groove 7 in the form of a circular sector, the angle at the top of each groove 7 being identical and inclined in the direction toward the peripheral wall 9 of the fixation piece 2. Thus, in the assembled position of the two annular pieces 3, 4, the fixation piece 2 is provided with an annular groove 8 having a cross section form of a circular sector of which the axis of symmetry is orthogonal to the axis of the envelope 1. In addition, the fixation piece 2 comprises an external peripheral face 9 provided with an annular groove extending from the groove 8, toward the top thereof.

Additionally, a correct positioning of the two annular pieces 3, 4 opposite one another is assured by an annular groove 10 arranged on the assembly face 3a of one of the pieces, inside the annular groove 8, upon the interior of which is provided an annular rib 11 of a conjugate form, projecting from the assembly face 4a of the second piece.

Once their positioning is assured, the assembly of these two annular pieces 3, 4 is secured by means of fixation screws 5, 6 able to be screwed into the threaded bores provided on opposite sides of the annular groove 8.

Around the annular groove 8 are arranged a plurality of the fan-shaped flanges 12 having shapes conjugate to that of the groove, and provided on the end of each gore 13 forming the envelope 1.

Figure 1A:
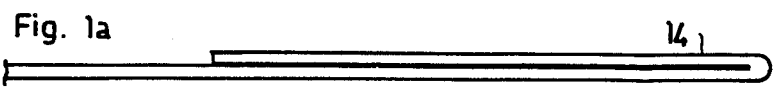
FIGS. 1A and 1B are schematic cross-sections on an enlarged scale illustrating the formation of a double hem in accordance with the process of the invention.
Figure 1B:
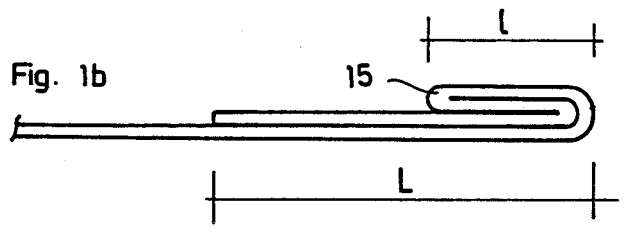
Figure 2:
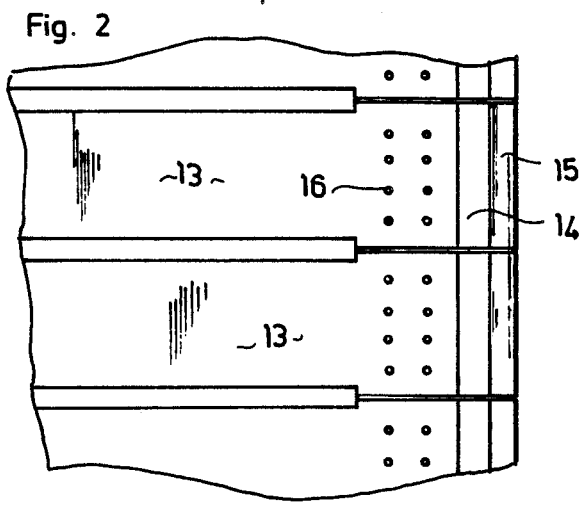
FIG. 2 is a partial plan view of an end portion of the envelope such as prepared in order to carry out the gathering.
Figure 3:
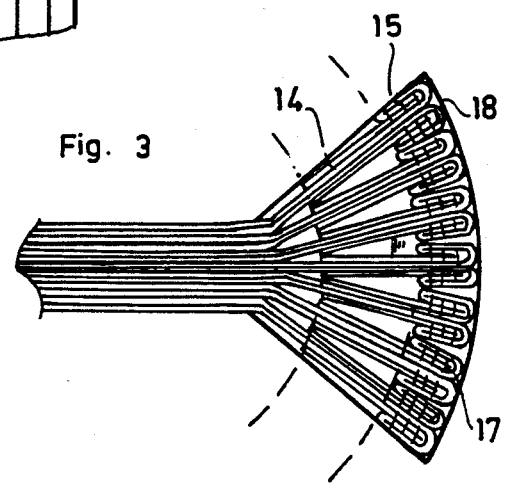
FIG. 3 is a transverse sectional view on an enlarged scale of a flange in an fan-shaped configuration according to the invention.

The manner of forming these flanges 12 is described hereafter with respect to FIGS. 1, 2, and 3.

In a preliminary phase, the different gores 13 are arranged on an assembly table upon which they are maintained under tension. These gores 13 are then assembled longitudinally, this assembly being interrupted at a given distance from their longitudinal extremities. They are then cut transversely to the level of at least one of their longitudinal extremities, in such a manner as to obtain strictly identical longitudinal gores.

The extreme ends of each gore are then folded a first time upon themselves in order to form a first hem (1a), then a second time in order to form a second hem 15 of width (1) less than the width (L) of the first hem 14 (FIG. 1b). During these folding operations, the width (1) and (L) of the hems 14, 15 are precisely determined by the use of two stops arranged successively at right angles to the longitudinal extremity of the gore.

Once the double hem 14, 15 is achieved, the extreme edge of each gore 13 is gathered transversely, in accordian fashion, in such a manner as to form a fan-shaped bulge or flange 12. At the time of this folding, the fan-shaped form is obtained naturally, the second hem 15 presenting a width (1) less than the width (L) of the first hem 14.

Additionally, in order to obtain a regular fan-shaped form of which the different hems are of the same width, the gore 13 is provided transversely with at least two identical series of apertures 16 positioned at predetermined distances from the longitudinal extremity. Each series comprises apertures 16 arranged at equidistant intervals corresponding to the width of the gathers of the fan-shaped gores (FIG. 2).

Then, at the time of folding, it is convenient to use a gauge provided with two spaced arms of equal lengths at a distance separating the two series of apertures 16. The realization of the different gathers is thus obtained by successively positioning the apertures 16 of the two series in opposition on the arms of the gauge.

The flange 12 having been formed, it is then unfolded again in order to coat the different the folds with a hardenable resin. The hems 14, 15 are then re-established and sewn by means of "Kevlar" thread 17. Finally, the flange 12 is itself reformed and arranged in a mold 18 of a shape identical to the annular groove 8 of the fixation piece 2. Then the form of this mold is adapted to obtain a tangency of the extremities of the first hem 14 of two adjacent seams. The relative position of the different seams and, consequently, the overall form of the flange 12 are precisely defined.

In the interior of this mold 18, the hem is immersed in a hardenable resin which permits obtaining a double wedge effect (along Lines C, C' of FIG. 3) of which the advantage resides in the increase of the frictional surfaces at the time the flange 12 is placed in compression.

Figure 4:
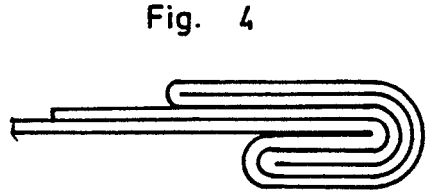
FIG. 4 is a schematic cross sectional view on an enlarged scale illustrating a triple hem.

This wedge effect having a prime importance for the behavior of the assembly, it is also possible to be refolded again, upon itself, the double hem (14, 15), around the first hem 14, such as is shown in FIG. 4.

The provision of this third hem or fold permits obtaining a supplemental wedge effect along line C' of FIG. 3 and, consequently, comprises a supplemental element serving to guarantee the self-locking of the flange. Moreover, this third hem permits subjecting each seam of the flange to symmetrical forces with respect axes thereof.

Thus, after the gluing and sewing operations of the folds of the hems 14, 15, the gluing of the wedge-shaped seams, and the injection of a hardenable resin, the flange 12 forms a homogeneous block in which all of the frictional surfaces are solicited. The tensioning of the gore 13 thus creates compression of all of the components of the flange 12, and the self-locking of the flange at the interior of its groove.

It should be noted that all of the geometric characteristics (width (1) and (L) of the hems, width of the seams, relative position of the seams . . . ) determining the shape of the flange 12 are precisely defined. It is therefore convenient to establish a method of calculation which permits optimizing these parameters and finding the best compromise for resolving the problems of the interface between a flexible structure and a rigid structure. Moreover, the different strands comprising the longitudinal warp of the envelope are established independently one from another and subjected to the same tensile forces. The resistance of the envelope 1 is particularly not altered by the presence of these slits arranged on the extreme end portion of the gores, these gores being essentially longitudinally parallel to the threads of the warp.

Moreover, each gore 13 may be tested individually before hooking the envelope to the fixation pieces. The reliability of the space balloons is therefore notably enhanced.

The plurality of flanges being obtained, the flanges are disposed at the interior of the annular groove 8 on the fixation pieces 2. The interstices separating the flanges 12 are therefore filled by means of a hardenable resin injected by means of an injection hole provided in each fixation piece 2. The assembly of the flanges 12, embedded in the resin, thus forms a homogeneous block permitting the forces acting upon the envelope 1 to be taken up by the fixation piece 2.

It should be noted that a better definition of the system of revolution and the formation of a weaker homogeneous block which is not angular may be obtained by multiplying the number of flanges 12. In this case, the extreme portion of each gore 13 may be divided into several separate bands, on a length equivalent to the non-assembled length of the gores, by a longitudinal slit. Several identical flanges 12 may thus be obtained at the level of the extreme edge of each gore 13.

Given the presence of the apertures 16 permitting the gathering of the gores 13, the longitudinal slits separating these gores, and the apertures for the passage of the fixation screws 5 assuring the assembly of the two annular pieces 3, 4, the gas-tight seal of the space balloon may not be assured by the envelope 1 itself.

For this reason, it is preferable to use a band 19 of sealing film fixed by one part to the fixation piece 2 and by the other part to the internal face of the envelope 1 at the level of the extremity of the longitudinal slits. One of the ends of this band 19 is arranged in an annular groove 20 provided on the external peripheral face 9 of the fixation piece 2. The locking of the band 1 is assured by winding in this groove a cable 21 of "Kevlar". The other end is therefore cemented then sewn onto the envelope 1 and serves as a band for stopping the slits separating the different gores 13.

Moreover, this band of sealing film 19 is of a length appropriate to avoid its being subjected to tensile forces when the envelope 1 is placed in tension.

The hooking device illustrated in FIGS. 5 and 6 permits hooking onto the fixation piece a steerable aerostatic balloon comprising an external envelope 1 containing air and as described hereinabove, a network of longitudinal reinforcements 22, a network of circumferential reinforcements (not shown), an internal envelope 23 containing a lighter than air gas and an interpolar connector 24 connecting the upper and lower poles of the external envelope.

The device comprises, for hooking the internal envelope 23, a rim 25 of a rigid material. This rim 25 is provided, on its external peripheral face 26 with an annular peripheral groove 27 on the interior of which is provided the extremity of the envelope 23. The locking is assured by winding a cable 28 of a substantially inextensible material of high tensile strength,for example of "Kevlar". Being of a diameter less than the diameter of the fixation piece 2, the rim 25 is concentrically fixed on this piece by the intermediary of a ring 29 of an intermediate diameter, securely attached to the rim 25 and to the fixation piece 2.

The device also comprises means for hooking the longitudinal reinforcement 22, arranged on the annular piece 3 positioned on the exterior of the envelope 1. This hooking means comprises an annular step 30 provided on the external side of the face 31, opposite the assembly face 3a, of the annular piece 3. In the bottom of this step 30 are arranged a plurality of studs such as 32 (FIG. 7).

Figure 7:
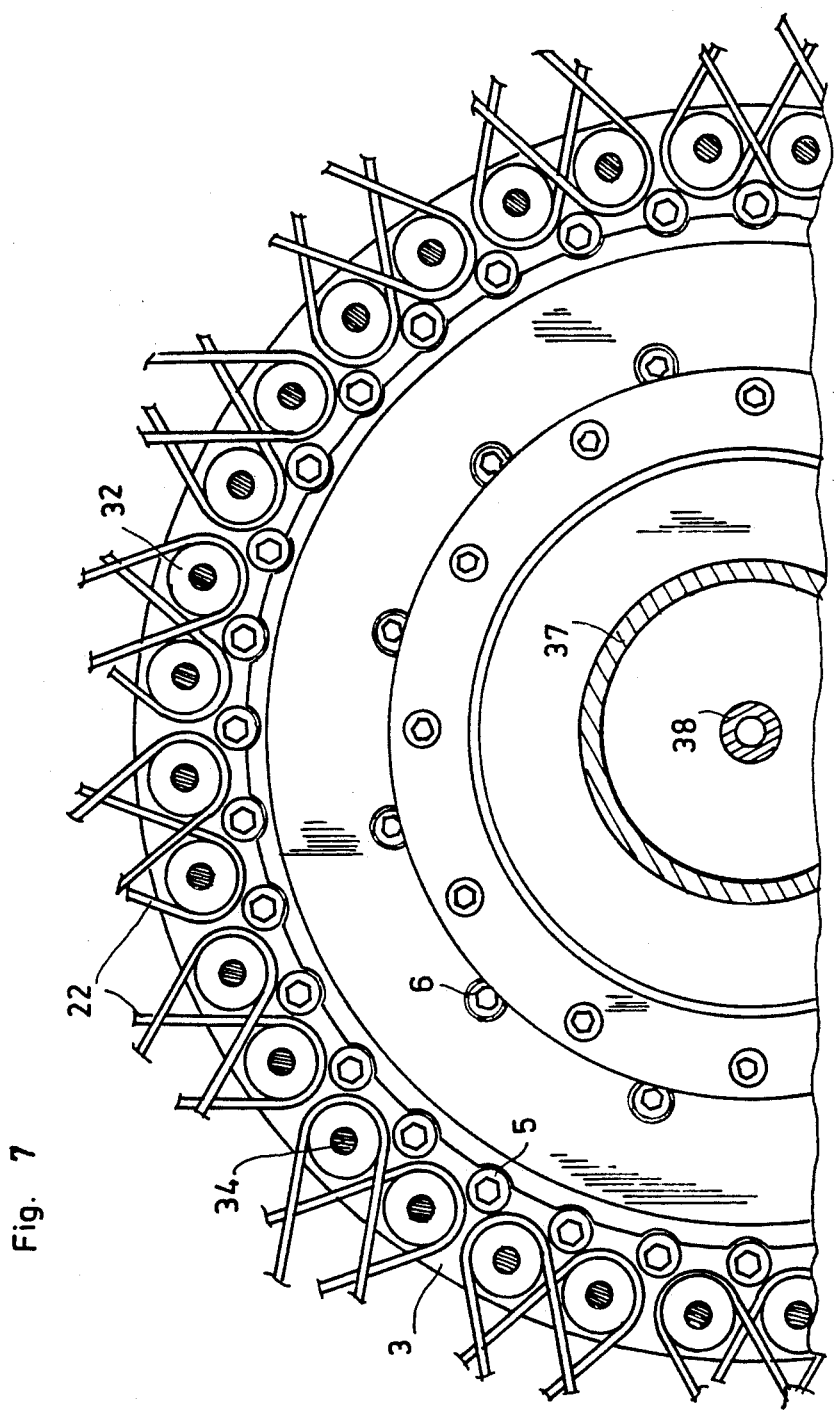
FIG. 7 is a partial transverse sectional view along the lines A—A of FIG. 6 showing the means for hooking the network of longitudinal reinforcements of the envelope.

The longitudinal reinforcements 22 formed of endless cables made from braids of spliced and connected "Kevlar", are wrapped 180° around the studs 32 and distributed in such a manner as to form a radiating structure with crossed rays on the bottom of the external envelope 1 (FIG. 7). This arrangement permits the transmission to the envelope 1 of torque for rotating the same.

In order to avoid the release of the longitudinal reinforcements 22, the studs 32 are covered by an annular cover 33 resting upon the studs 32 and on the face 31, and secured on the annular piece 3 by means of fixation screws 34.

Figure 8:
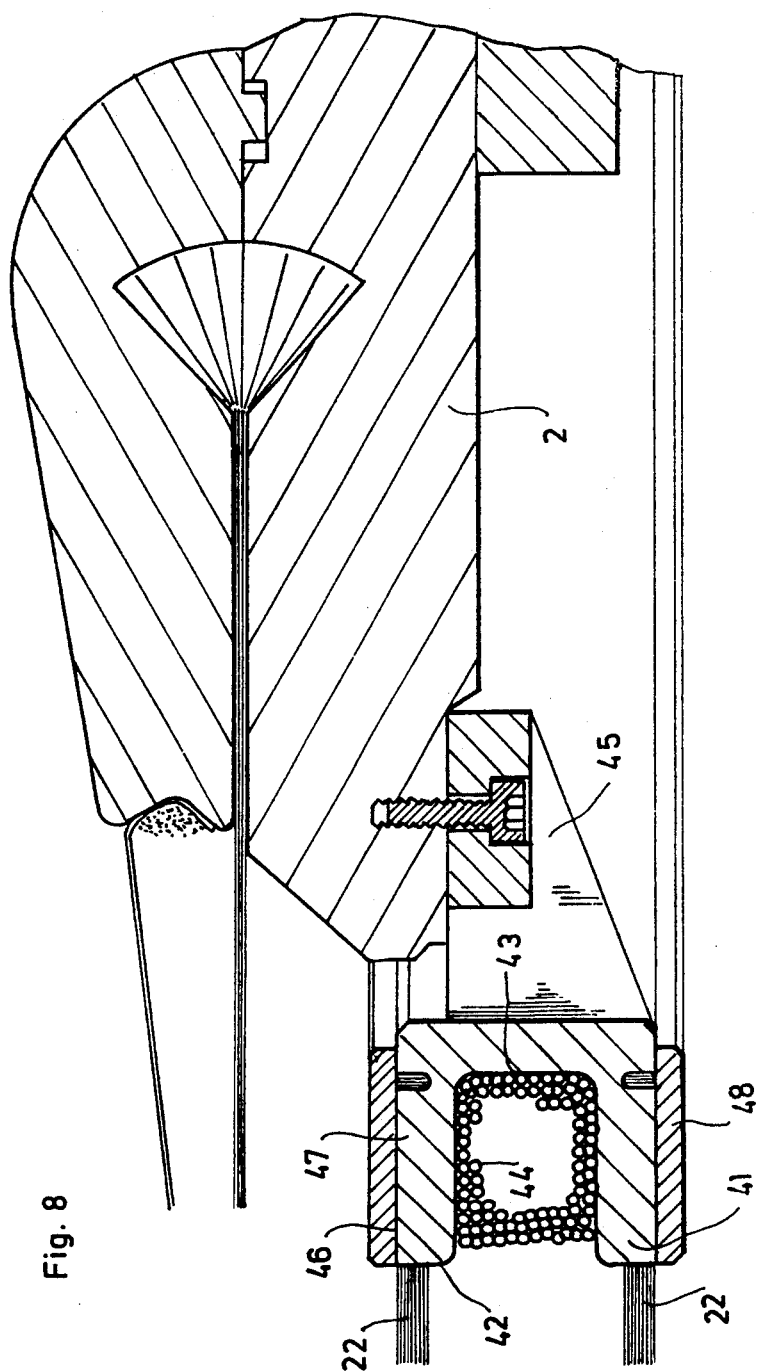
FIG. 8 is a longitudinal sectional view showing a second embodiment of the means for hooking the longitudinal reinforcements.

When using envelopes subject to very significant over pressure forces, the hooking means of the longitudinal reinforcements 22 on the fixation piece 2, described above, may advantageously be replaced by hooking means shown in FIG. 8.

These hooking means comprise a rim 41 made of a rigid material. This rim 41 is provided, on its outer peripheral face 42, with an annular groove 43 on the interior of which is wound a cable 44 of a substantially inextensible material of high tensile strength. However, being greater than the diameter of the fixation piece, this rim is secured concentrically on the latter by the intermediary of radial arms 45, or by any other known means.

The peripheral edges 46 of this rim 41 are each provided with a plurality of studs 47. Hooking of the reinforcements 22 comprises arranging these reinforcement around the studs 47, as previously described, their eventual release, after having been put in place, being avoided by the attaching of the covers 48.

The advantage of this hooking apparatus stems from the fact that the reinforcements 22 are hooked alternatively to one and the other peripheral edge 46 of the rim 41. Thus, the rim subjected to the symmetrical forces is not subjected to torsion.

Moreover, the self-equilibrium of the forces at the point of this apparatus, due to the annular form of the rim 41, limits considerably the forces transmitted to the fixation piece 2.

The fixation pieces 2 are, finally, provided with means for admitting and releasing air and also means for admitting or releasing helium.

The means for admitting or releasing air are provided on the fixation piece 2 situated at the level of the lower pole of the envelope 1 (FIG. 6). To this effect, the ring 29 forms an internal chamber 35 which communicates by the apertures 36 with the interior of the external envelope 1.

The conduit for introducing the air 37 is provided with a three-way valve (not shown) which permits achieving either an evacuation of air, or admission of air coming from a turbo compressor or equivalent means.

The filling of the internal envelope with helium is carried out through a conduit 38 which passes in a sealed manner through the ring 29 for emptying into an expansion chamber 39 through an orifice 38a situated on the axis of the balloon. In order to avoid any deterioration of the internal envelope, this expansion chamber 39 communicates with the interior of the internal envelope by the intermediary of a grill 40 provided with small cross-section apertures.

While this invention has been described as having certain preferred features and embodiments, it will be understood that it is capable of still further modification and variation without departing from the spirit of the invention, and this application is intended to cover any and all variations, modifications, and adaptations of the invention which fall within the spirit of the invention and the scope of the attached claims.

I claim:

1. A process for hooking a longitudinal extremity of a band of a flexible material onto a fixation piece, comprising:
    longitudinally folding said extremity upon itself at least one time in such a manner as to form at least one first hem (14, 15),
    transversely gathering in accordian fashion the hem extremity in such a manner as to form a flange having a fan-shaped configuration,
    providing a fixation piece having a groove having a longitudinal cross-section of a wedge-shaped form conjugate to the form of the flange, said groove having a longitudinal extremity open towards its apex,
    arranging said flange (12) in said groove in the fixation piece with the band extending out from said groove at the open apex thereof, in such a manner as to generate a selflocking of the flange when the band is placed in tension.

2. A process as in claim 1, and including folding the extremity of the band at least two times upon itself in such a manner as to form at least one double hem (14, 15), said double hem (15) having a width (1) less than the width (L) of said first hem.

3. A process as in claims 1 and including providing said groove of the fixation piece such that its axis of symmetry is situated in the extension of the longitudinal axis of the band.

4. A process as in claim 2, and including securing between the opposing faces of said first hem (14, 15), the opposing faces of two successive hems.

5. A process as in claim 2, and including sewing the different folds of the hems (14, 15), by means of threads (17) of a material of high tensile strength.

6. A process as in claim 1 and including injecting a hardenable resin into said groove in the fixation piece, after placing the flange (12) in such a manner as to embed said flange in said resin.

7. A process as in claim 1 for hooking an envelope (1) of flexible material to a fixation piece (2) comprising:
    longitudinally slitting over a given length and at equidistant intervals one end portion of said envelope, for forming a plurality of bands,
    forming one of said flanges (12) having a fan-shaped configuration at the outer edge of each of said bands,
    wherein said annular fixation piece (2) is formed of a rigid material and having an annular groove (8) with a cross-section in the form of circular sector conjugate to the form of the flanges (12), said annular groove being provided at its apex with at least one opening extending to the peripheral wall (9) of the fixation piece (2), around the periphery thereof, and
    arranging the different flanges (12), side by side in the interior of said groove (8) of the fixation piece (2).

8. A process as in claim 7 and including providing the annular groove (8) of the fixation piece in such a manner that its transverse plane of symmetry is essentially orthogonal to the axis of the envelope.

9. A process as in claim 7 for hooking to a fixation piece (2), an envelope (1) of a generally cylindrical form made from rectangular gores (13) of the same width, assembled longitudinally, comprising interrupting the assembly of said gores at a predetermined distance from their longitudinal extremity for forming a plurality of bands, fashioning the outer end of each band in a manner such as to produce, a plurality of said fan-shaped flanges (12).

10. A process as in claim 7, and including providing said fixation piece (2) in the form of two separable annular pieces (3, 4) having opposing faces (3a, 4a) of forms adapted to cooperatively form said annular groove (8) in the assembled position of said pieces.

11. A process as in claim 10, and including providing said annular groove (8) at the center of the fixation piece and assembling the two annular pieces (3, 4) by means of screw members (5, 6) on opposite sides of said annular groove.

12. A process as in claim 7 and including providing a sealing flap (19) fixed on one end to the internal face of the envelope (1) adjacent the extremity of the longitudinal slits, so as to serve as a stop band for said slits, and on the other end to the fixation piece (2).

13. A process as in claim 12 and including providing a sealing flap (19) of a width adapted to permit its non-transmission of tension, when the envelope is placed under tension.

14. A process as in claim 7, for hooking to an annular fixation piece (2) a network of reinforcements (22) extending longitudinally along an envelope of a generally cylindrical form, said process comprising arranging said reinforcements on said fixation piece in such a manner as to form a radiating structure with crossed rays on the bottom of said envelope.

15. A process as in claim 14 for hooking to a fixation piece a network of longitudinal reinforcements, comprising:
providing an annular rim (41) having an external peripheral face (42) having a annular groove (43) and peripheral edges (46) each provided with studs (47),
fixing the rim (41) concentrically around the fixation piece (2),
hooking the longitudinal reinforcements (22) alternatively to the studs (47) on one and the other peripheral edge (46) of the rim (41),
arranging in the annular groove (43) of the rim (41) a pressure collar (44) made of an essentially inextensible material of high resistance to tension in order to take up longitudinal forces transmitted by the reinforcements, for placing said collar in tension.

16. An apparatus for hooking an envelope (1) of at least one sheath of a flexible material to a rigid annular fixation piece (2), said apparatus comprising two annular pieces (3, 4) having opposing assembly faces (3a, 4a) adapted to cooperatively form a first annular groove (8) having a wedge-shaped cross section, said fixation piece comprising an external peripheral face (9) provided with a second annular groove extending toward said first annular groove (8), at the top thereof, said first annular groove having a cross section in the form of a circular sector and an axis of symmetry orthogonal to the longitudinal axis of said envelope, said first annular groove being internal of said fixation piece.

17. An apparatus as in claim 16 and wherein said annular groove (8) is arranged at the center of the fixation piece (2), said apparatus comprising a sealing flap (19) secured on one end to the internal face of the envelope, in such a manner as to for a stop band for longitudinal slits arranged on the end portion of said sheath and, on the other hand, to the fixation piece (2),
means for assembling said two annular pieces (3, 4), comprising screw members (5, 6) arranged on opposite sides of said annular groove (8).

18. An apparatus as in claim 16 for hooking to a fixation piece (2) an envelope (1) of a generally cylindrical form reinforced exteriorly by a network of reinforcements (22) extending longitudinally along said envelope, said apparatus further comprising hooking means (30, 32, 33, 34; 41-48) for hooking said reinforcements so as to permit their arrangement on a radiating structure with crossed rays, at the bottom of said envelope.

19. An apparatus as in claim 18 characterized in that said means for hooking said longitudinal reinforcements (22) comprises:
a rim (41) of a rigid material having an external peripheral face (42) provided with an annular groove (43) said rim comprising peripheral steps (46) each being provided with a plurality of projecting studs (47),
means for fixing (45) said rim (41) on the fixation piece (2) for positioning said rim concentrically with respect to said fixation piece, and
a winding of cable arranged in said annular groove (43) and formed of a substantially inextensible material of high tensile strength wound around the interior of said groove.

* * * * *